US011090521B2

(12) United States Patent
Yoon

(10) Patent No.: US 11,090,521 B2
(45) Date of Patent: Aug. 17, 2021

(54) EXERCISE MANAGEMENT DEVICE USING HULA HOOP HAVING DEVICE FOR MEASURING SPINNING DIRECTION AND EXERCISE AMOUNT

(71) Applicant: VIRFIT CORP., Seoul (KR)

(72) Inventor: Moo Hyun Yoon, Seoul (KR)

(73) Assignee: VIRFIT CORP., Seoul (KR)

( * ) Notice: Subject to any disclaimer, the term of this patent is extended or adjusted under 35 U.S.C. 154(b) by 457 days.

(21) Appl. No.: 15/999,751

(22) PCT Filed: Feb. 23, 2017

(86) PCT No.: PCT/KR2017/002019
§ 371 (c)(1),
(2) Date: Aug. 20, 2018

(87) PCT Pub. No.: WO2017/146498
PCT Pub. Date: Aug. 31, 2017

(65) Prior Publication Data
US 2021/0016122 A1    Jan. 21, 2021

(30) Foreign Application Priority Data
Feb. 25, 2016    (KR) .......... 10-2016-0022314

(51) Int. Cl.
*A63B 19/00*        (2006.01)
*A63B 24/00*        (2006.01)
(Continued)

(52) U.S. Cl.
CPC .......... *A63B 19/00* (2013.01); *A63B 24/0006* (2013.01); *A63B 21/0004* (2013.01);
(Continued)

(58) Field of Classification Search
CPC ... A63B 19/00; A63B 21/0004; A63B 21/227; A63B 21/4009; A63B 21/4041;
(Continued)

(56) References Cited

U.S. PATENT DOCUMENTS

D343,209 S  *  1/1994  Lee ................................ D10/97
9,345,920 B2 *  5/2016  Seroussi ................ A63B 19/00
(Continued)

FOREIGN PATENT DOCUMENTS

KR          20-0248876 Y1    11/2001
KR          10-0803447 B1     2/2008
(Continued)

OTHER PUBLICATIONS

Search Report, dated Apr. 28, 2017, for International Application No. PCT/KR2017/002019.
(Continued)

*Primary Examiner* — Megan Anderson
(74) *Attorney, Agent, or Firm* — LRK Patent Law Firm

(57) ABSTRACT

An exercise management device using a hula hoop having a device for measuring spinning direction and exercise amount includes: an annular body part; a sensor unit including a gyro sensor, an acceleration sensor, and a gravity sensor; a hula hoop including a control unit including a MICOM for receiving and analyzing a data value detected by the sensor unit to calculate and obtain exercise information, a communication unit having a Bluetooth chip for transmitting the exercise information or the data value, and a power unit for switching on/off the control unit; and a wireless communication device having a dedicated program for receiving the exercise information or the data value transmitted from the communication unit and displaying the exercise information.

6 Claims, 9 Drawing Sheets

(51) Int. Cl.
*A63B 21/00* (2006.01)
*A63B 71/06* (2006.01)

(52) U.S. Cl.
CPC ... *A63B 24/0084* (2013.01); *A63B 2024/0009* (2013.01); *A63B 2024/0015* (2013.01); *A63B 2024/0068* (2013.01); *A63B 2024/0071* (2013.01); *A63B 2071/0652* (2013.01); *A63B 2208/0204* (2013.01); *A63B 2220/16* (2013.01); *A63B 2220/17* (2013.01); *A63B 2220/18* (2013.01); *A63B 2220/35* (2013.01); *A63B 2220/40* (2013.01); *A63B 2220/833* (2013.01); *A63B 2230/75* (2013.01)

(58) Field of Classification Search
CPC ............ A63B 21/4049; A63B 24/0006; A63B 24/0084; A63B 2024/0015; A63B 2024/0068; A63B 2024/0009; A63B 2024/0071; A63B 2071/0652; A63B 2208/0204; A63B 2220/18; A63B 2220/40; A63B 2220/14; A63B 2220/833; A63B 2220/16; A63B 2220/35; A63B 2230/75
See application file for complete search history.

(56) References Cited

U.S. PATENT DOCUMENTS

| | | | | |
|---|---|---|---|---|
| 9,370,727 | B2* | 6/2016 | Deluz | F21S 10/023 |
| 9,616,288 | B2* | 4/2017 | Greenberg | A63B 71/0622 |
| 9,687,688 | B2* | 6/2017 | Hsiao | A63B 19/00 |
| D847,910 | S * | 5/2019 | Yoon | D21/457 |
| 2014/0342882 | A1* | 11/2014 | Huang | A63B 21/222 |
| | | | | 482/110 |
| 2016/0279470 | A1* | 9/2016 | Campbell | A63B 23/0211 |
| 2016/0332018 | A1* | 11/2016 | Granat | A63B 19/00 |

FOREIGN PATENT DOCUMENTS

| | | |
|---|---|---|
| KR | 10-0832598 B1 | 5/2008 |
| KR | 20-0440807 Y1 | 7/2008 |
| KR | 10-1161166 B1 | 7/2012 |

OTHER PUBLICATIONS

Written Opinion, dated Apr. 28, 2017, for International Application No. PCT/KR2017/002019.

* cited by examiner (a)

(b)

○ Circumference of body part to be exercised

◌ Hula hoop

◌ Movement path of hula hoop controller (c)

(d)

EXERCISE MANAGEMENT DEVICE USING HULA HOOP HAVING DEVICE FOR MEASURING SPINNING DIRECTION AND EXERCISE AMOUNT

CROSS-REFERENCE TO RELATED APPLICATIONS

The present application is a U.S. National Phase entry from International Application No. PCT/KR2017/002019, filed Feb. 23, 2017, which claims priority to Korean Patent Application No. 10-2016-0022314, filed Feb. 25, 2016, the disclosure of which is incorporated by reference herein in its entirety.

BACKGROUND

1. Technical Field

The present invention relates to an exercise management device using a hula hoop having a device for measuring a spinning direction and an exercise amount, and more particularly, to an exercise management device using a hula hoop having a device for measuring a spinning direction and an exercise amount, which enables balanced exercise in both directions and is capable of automatically storing exercise data for analysis thereof.

2. Description of Related Art

A hula hoop was popularized in Australia in 1957 and has been spread to the United States, Japan, Korea, and so on. In Korea among them, it has been prevalent since 1959. The hula hoop is typical play or exercise equipment that has a diameter of about 1 m and an annular shape made of a plastic material and is spun with the use of a waist for training to keep the waist supple and slim or reduce abdominal fat. The hula hoop was widely used as play equipment in the early days, whereas it has been widely used as exercise equipment for the purpose of rhythmic gymnastics, dances, diets, or the like in recent years. In the case where the hula hoop is used as exercise equipment, the weight of the hula hoop is increased to 1 kg or more to improve exercise effect or acupressure protrusions are formed inside the hula hoop (on the inner peripheral surface thereof) to provide the abdomen and the waist with strong stimulation. The hula hoop used as exercise equipment should be used for at least 30 minutes to get an aerobic exercise effect. However, there may be a risk that spine-related diseases occur when the hula hoop is spun only in one direction for exercise, and a user may be bored during exercise due to simple and repetitive waist-spinning, which may also lead to the inhibition of continuous exercise.

Korean Patent No. 10-1161166 discloses a hula hoop that has a pressure sensor attached therein to display calories burned by exercise and information on the number of waist spins, and allows a reminder time to be set for switching an exercise direction to beep when it is time to switch the exercise direction. However, it is difficult to balance exercise in both directions due to displaying the total number of spins in both directions without distinguishing the directions when the calories burned by exercise and the number of waist spins are displayed, and it is inconvenient in that a user has to separately record and manage stored exercise information, e.g., calories burned by exercise, the number of spins, an exercise time, and the like.

SUMMARY

An object of the present invention is to provide an exercise management device using a hula hoop having a device for measuring a spinning direction and an exercise amount, which enables balanced exercise in both directions to prevent an occurrence of spine-related diseases and is capable of automatically recording and managing exercise information.

Another object of the present invention is to provide an exercise management device using a hula hoop having a device for measuring a spinning direction and an exercise amount, which is capable of automatically measuring a user's waist circumference using an obtained data value to thus provide a customized exercise plan.

In order to accomplish the above objects, the present invention provides an exercise management device using a hula hoop, which includes a hula hoop comprising: an annular body; a sensor unit comprising (a) a gyro sensor provided at one side of the body to measure an angular velocity, (b) an acceleration sensor for measuring an acceleration, and (c) a gravity sensor for detecting the direction of gravity; and a control unit comprising (1) a micro controller unit for receiving and analyzing a data value detected by the sensor unit and calculating a spinning speed, a spinning direction, and the number of spins to obtain exercise information or transmit the data value, (2) a communication unit having a Bluetooth chip for transmitting the exercise information or the data value to the outside, and (3) a power unit for turning on/off the control unit by supplying or blocking power; and a wireless communication device having a dedicated program installed therein for receiving the exercise information or data value transmitted from the communication unit to display the exercise information or display exercise information obtained by analyzing the data value and calculating the spinning speed, the spinning direction, and the number of spins.

Advantageous Effects of Invention

An exercise management device according to the present invention enables a user to perform balanced exercise in both directions by distinguishing left and right directions to thus prevent an occurrence of spine-related diseases and can automatically record and manage exercise information.

In addition, the exercise management device according to the present invention can measure a user's waist circumference using an obtained data value to thus provide a customized exercise plan for each user, and can analyze exercise data.

DETAILED DESCRIPTION OF EMBODIMENTS

Hereinafter, the present invention will be described in more detail with reference to the accompanying drawings.

Figure 1:
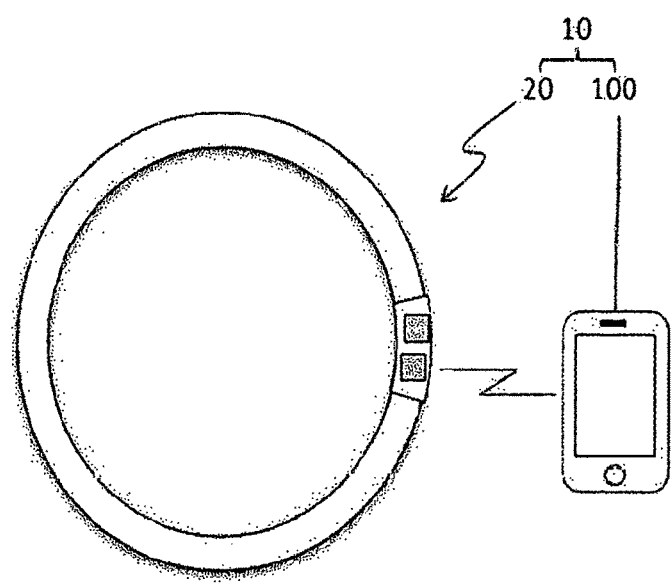
FIG. 1 is a view for explaining an exercise management device according to an embodiment of the present invention.

FIG. 1 is a view for explaining an exercise management device according to an embodiment of the present invention. As illustrated in FIG. 1, an exercise management device 10 using a hula hoop having a device for measuring a spinning direction and an exercise amount according to an embodiment of the present invention includes a hula hoop 20 that has a spinning direction and exercise amount measuring device, and a wireless communication device 100 that displays a user's exercise data based on a data value transmitted from the hula hoop.

Figure 2:
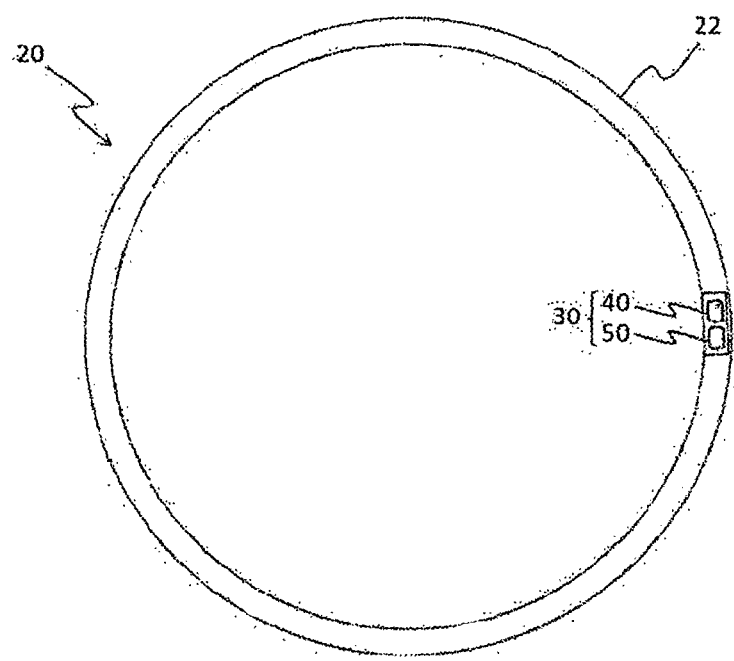
FIG. 2 is a top view illustrating a hula hoop according to an embodiment of the present invention.
Figure 3:
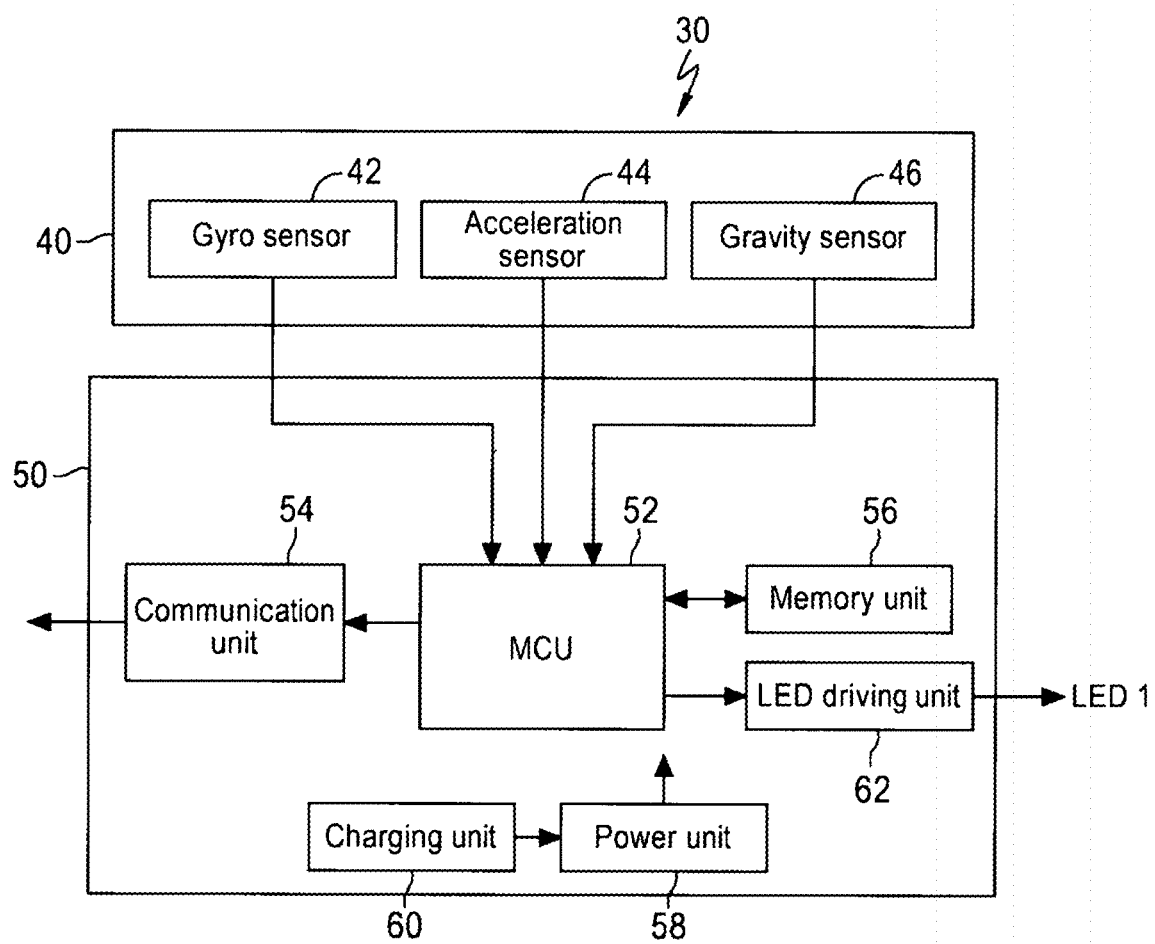
FIG. 3 is a diagram for explaining detection of exercise data from the hula hoop according to the embodiment of the present invention.

FIG. 2 is a top view illustrating the hula hoop according to the embodiment of the present invention. FIG. 3 is a diagram for explaining detection of exercise data from the hula hoop according to the embodiment of the present invention. As illustrated in FIGS. 1 to 3, the hula hoop 20 according to the embodiment of the present invention includes a body 22 and a controller 30.

The body 22 serves to maintain the shape of the hula hoop and has an annular shape. The body 22 may be made of a typical material and have a typical diameter. For example, the body 22 may be made of a material such as plastic, and have a diameter of 0.5 to 2 m, preferably a diameter of 0.7 to 1.5 m.

The controller 30 is provided at one side of the body 22 to measure the number of spins and a spinning direction and transmit a measured data value, and includes a sensor unit 40 and a control unit 50.

The sensor unit 40 serves to measure the user's exercise data (e.g., the number of spins and spinning direction of the hula hoop) and includes a gyro sensor 42, an acceleration sensor 44, and a gravity sensor 46.

The gyro sensor 42 is a sensor for measuring an angular velocity and may obtain a value of the angle at which the hula hoop spins about one axis during a unit time. The angular velocity refers to an angle of rotation during unit time and may be measured in a typical manner (see FIGS. 4 to 6). Also, since the data value measured by the gyro sensor 42 may vary depending on the change in temperature, the gyro sensor 42 may be further provided with a temperature sensor for checking a change in temperature to correct a data value as occasion demands.

The acceleration sensor 44 is a sensor for measuring a linear acceleration to obtain a gradient, and may measure accelerations in the x-axis, y-axis, and z-axis directions when it moves in three dimensions. Since the acceleration sensor 44 basically detects the acceleration of gravity in a stopped state, it represents a value of —g (acceleration of gravity) in the z-axis direction. The acceleration sensor 44 enables an inclined angle to be measured in a typical manner. For example, in the case where the acceleration sensor 44 is securely mounted to the hula hoop and the initial output of the acceleration sensor 44 is set to be "0", when the hula hoop is inclined by an angle of in the y-axis direction, a z-axis acceleration data value is $a_z = g \times \cos\theta$ and an x-axis acceleration data value is $a_x = g \times \sin\theta$. The angle of rotation $\theta$ may be obtained by $\tan^{-1} a_x/a_z$ using the above two equations. The acceleration sensor 44 is used together with the data value of the gyro sensor 42 since it can detect only rotation between the horizontal and the vertical.

Since the gravity sensor 46 detects an absolute direction in the direction of gravity, it enables the ground direction (direction of gravity) to be recognized even when the hula hoop is reversed in a vertical direction (is overturned) at the time of exercise. Therefore, the gravity sensor 46 can detect the left-right direction of the hula hoop irrespectively of the up-down direction thereof. For example, the gravity sensor 46 may also use a geomagnetic sensor using terrestrial magnetism or a sensor which is typically referred to as a position sensor for detecting the direction of gravity in a physical manner by using movement of, for example, beads. In addition, the gravity sensor may be provided with both of the geomagnetic sensor and the position sensor, as occasion demands, to make it easier to detect the direction of gravity. The geomagnetic sensor is convenient in that, when power is turned on, it may detect the direction of gravity to normally distinguish the top and bottom of the hula hoop set during manufacture. On the other hand, the position sensor may be economical in that, when power is turned on, it detects the direction of gravity to distinguish the top and bottom of the hula hoop and costs less to manufacture.

The control unit 50 serves to turn on/off power and store and analyze the data value transmitted from the sensor unit 40 to transmit it to the wireless communication device. It includes a micro controller unit (MCU) 52, a communication unit 54, a power unit 58, and a charging unit 60.

The MCU 52 serves to analyze the data value received from the sensor unit 40, calculate a spinning speed, the number of spins, and a spinning direction (together with a user's waist circumference if needed) based on the analyzed data value, and transmit them to the wireless communication device 100 (see FIG. 1) through the communication unit 54 to be described later, or serves to transmit the data value received from the sensor unit 40 to the wireless communication device 100 through the communication unit 54. In order to prevent unnecessary consumption of a battery or power, power is automatically turned off if the data value is not transmitted from the sensor unit 40 within a certain time, for example, within more than 5 minutes, after the power is turned on.

The communication unit 54 may include a Bluetooth chip to communicate with the wireless communication device (smart phone, notebook, or the like) through Bluetooth or transmit data (exercise information or the like) to a dedicated program (application or the like). In addition, the controller may further include a USB port at one side thereof, as occasion demands, to interlock with a PC through cable lines.

The power unit 58 serves to turn on/off the power of the sensor unit 40 and control unit 50, and may be, for example, a button. In order to more easily check a power on/off state and/or a pairing state, a lighting unit (LED lighting unit or the like) 62 may be separately formed at the outer side of the control unit 50, wherein the lighting unit is turned on/off according to the power on/off state, preferably it is turned on when power is turned on whereas it is turned off when the power is turned off. Alternatively, the lighting unit 62 may be integrally formed with the power unit 58 such that light is emitted from the power button when power is turned on by pressing the power button. For example, the lighting unit 62 integrally formed with the power unit 58 may use two colors of blue and red, so that blue light is emitted when the power is turned on, blue light flickers in the pairing state, red light is emitted at the time of charging in a wired or wireless manner, and red light flickers when the power level of the battery is low (e.g., when the power level of the battery drops below 10% compared to the total charging amount of the battery).

The charging unit 60 serves to charge a power source in a typical manner, and may preferably charge the power source in wired or wireless manner. For example, the power source may be charged by a battery or the like, or charged through a USB port provided thereto and cable lines by power supplied from the outside. In addition, the power source may be charged by a wireless charging unit provided thereto in a wireless manner.

The control unit 50 of the present invention may further include a memory unit 56 that stores a user's exercise data for a certain period of time as occasion demands. Since exercise information is stored in the memory unit 56 for a certain period of time, for example, 1 to 10 days, preferably 1 to 3 days, when the data value (user's exercise data) transmitted through the communication unit 54 is lost or the dedicated program or the wireless communication device is problematic, the memory unit 56 enables the user's exercise data to be restored with safety.

The wireless communication device 100 has a dedicated program installed therein to receive the data value transmitted from the communication unit, and the movement of the hula hoop may be displayed in real time in the dedicated program, based on the data value transmitted thereto.

In addition, the dedicated program may receive the analyzed and calculated data from the MCU 52 and display it to the user, or may receive the data value through the communication unit 54 from the MCU 52, calculate a spinning speed, the number of spins, and a spinning direction (together with a user's waist circumference if needed) based on the received data value, and display them to the user. Since the MCU 52 must have high performance to calculate the spinning speed, the number of spins, and the spinning direction (together with the user's waist circumference if needed), the manufacturing costs thereof may be increased. Thus, it is preferable that the dedicated program receives the data value and calculates the spinning speed, the number of spins, and the spinning direction (together with the user's waist circumference if needed).

In addition, the dedicated program may display calories burned by exercise as numbers using exercised data values. To help the user understand a current ongoing exercise effect with more ease, it is preferable that the dedicated program displays, together with numbers, the food the user wants to select or the food recommended by itself (system) (e.g., in a random manner or the like), for example, pizza, chicken, Jajangmyon, cake, rice, meat, etc., and have the displayed food gradually disappears or appears according to which calories are burned up. For example, the dedicated program may be configured such that the shape of a chicken drumstick (which is typically 191 Kcal in calories) is displayed in the dedicated program and disappears according to the exercise amount of the user in such a manner that one fifth of the shape of the chicken drumstick disappears when the user exercises to burn 40 Kcal, about half of the shape of the chicken drumstick disappears when the user exercises to burn 100 Kcal, and the shape of the chicken drumstick completely disappears when the user exercises to burn that calorie (191 Kcal). Alternatively, the dedicated program may be configured such that the shape of the chicken drumstick appears according to the exercise amount of the user in such a manner that one fifth of the shape of the chicken drumstick appears when the user exercises to burn 40 Kcal, about half of the shape of the chicken drumstick appears when the user exercises to burn 100 Kcal, and the shape of the chicken drumstick completely appears when the user exercises to burn that calorie (191 Kcal).

The exercise management device according to the present invention recognizes that the user's exercise is completed when the power of the hula hoop is turned off. Thus, the exercise management device may analyze the exercise data calculated by the MCU 52 or the dedicated program, check whether the user performed balanced exercise in both directions (for example, compare times and/or amounts the user exercised in left and right directions), and show a notification message to the user through the dedicated program, thereby helping the user to correctly exercise (perform the balanced exercise in both directions). In addition, the exercise management device may show a notification message such as "You are doing well" or "Exercise amount has increased by x compared to yesterday," thereby inspiring the user's desire to consistently exercise. Here, x refers to an exercise amount of the day/an exercise amount of the day before.

Figure 4:
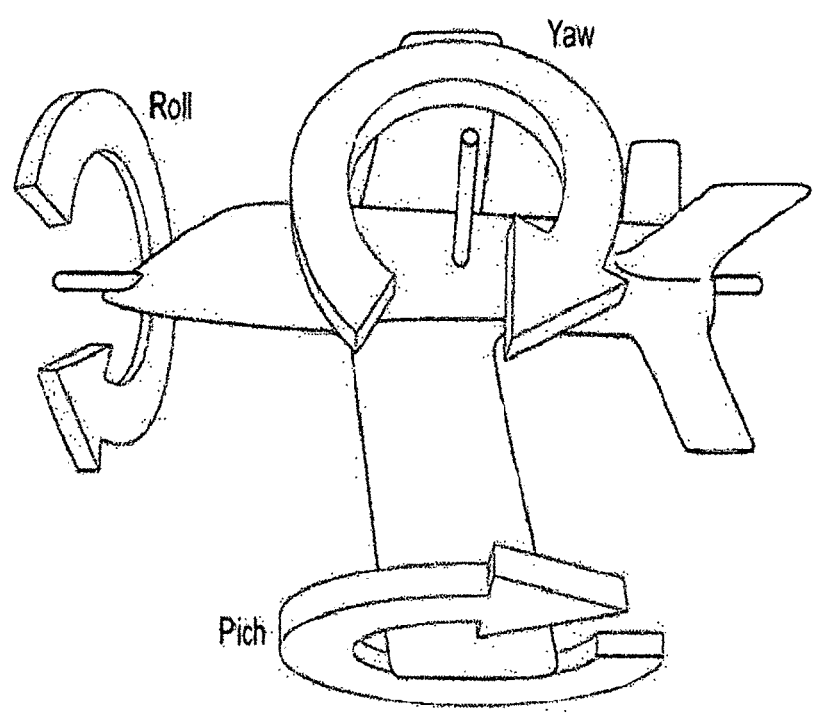
FIGS. 4 to 6 are views for explaining a process of obtaining exercise information using a sensor unit according to an embodiment of the present invention.
Figure 5:
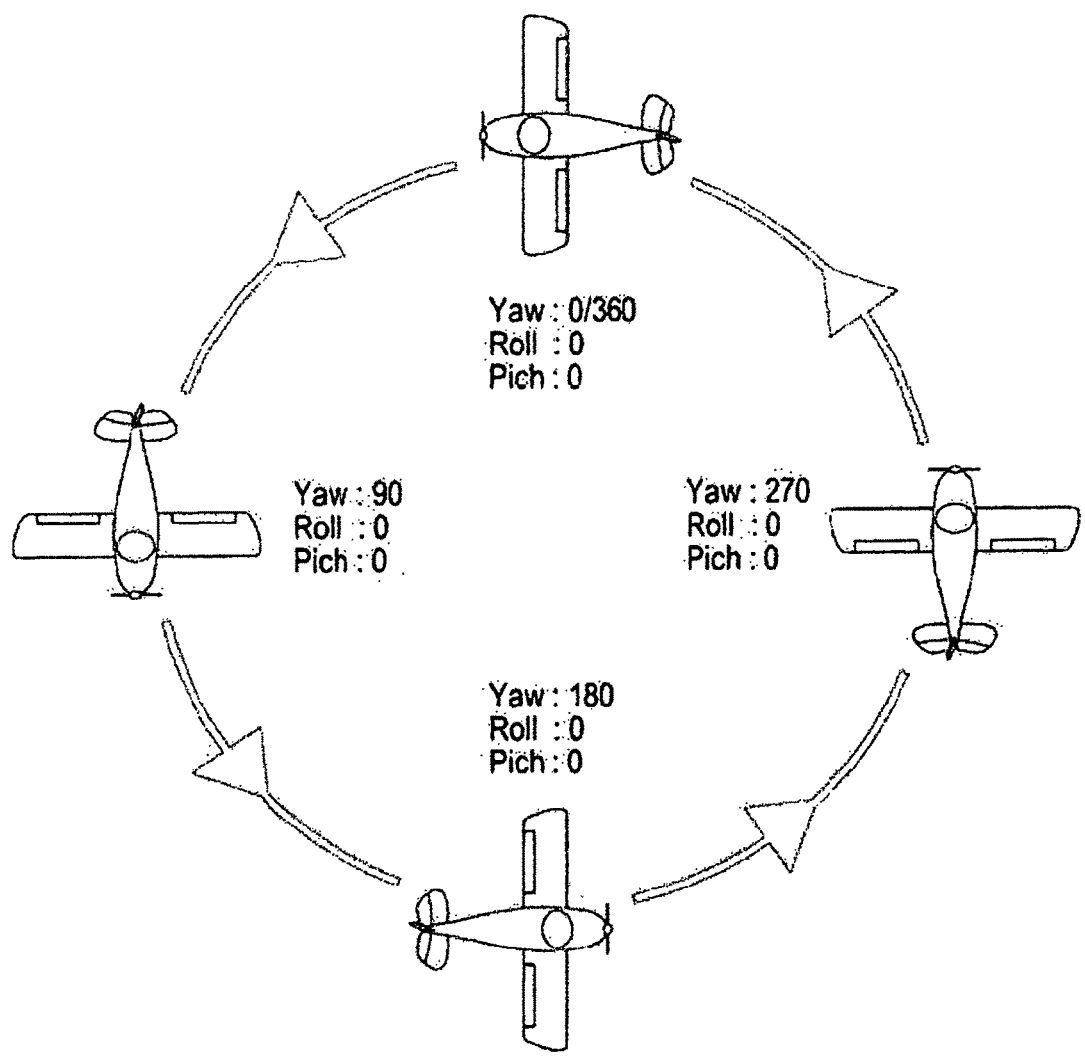
Figure 6:
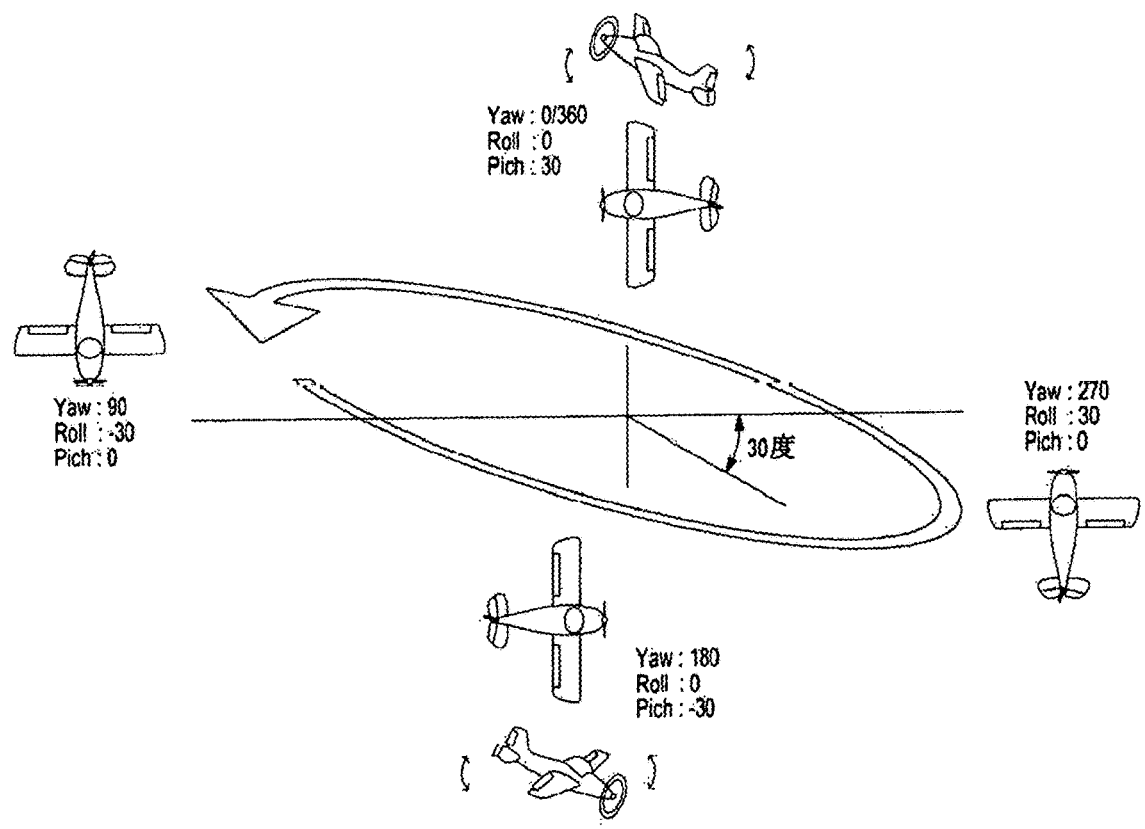

FIGS. 4 to 6 are views for explaining a process of obtaining exercise information using the sensor unit according to the embodiment of the present invention. The process for the hula hoop of the present invention will be described with reference to an exemplary airplane illustrated in FIGS. 4 to 6. When the user spins the hula hoop using her/his waist, the gyro sensor detects yaw, roll, and pitch. The yaw has a value that varies from zero (0) from 360 degrees depending on the spin of the hula hoop, and it is determined that the number of spins is "1" when the yaw value begins at 0 degrees and reaches 360 degrees. Here, the yaw indicates change values according to the movement in left and right directions, the pitch indicates change values according to the movement in forward and backward directions, and the roll indicates change values according to the rotation in left and right directions.

In addition, when the user spins the hula hoop, the hula hoop is also spun with a gradient. In this case, it is possible to determine whether the hula hoop is spun horizontally or with a gradient by detecting a change in pitch value. The user's exercise data may be evaluated as level (grade), preferably as "good", "fair", and "poor", by calculating a ratio between an exercise time for spinning horizontally and an exercise time for spinning with a gradient. For example, the user's exercise data may be evaluated as "good" when the average gradient with respect to the horizontal spin (the spin in the direction perpendicular to the user) is from zero (0) to 20 degrees, as "fair" when it is from more than 20 degrees to 40 degrees, and as "poor" when it exceeds 40 degrees.

Typically, the user often uses the hula hoop without distinguishing the top and bottom thereof, in which case the gravity sensor is used to distinguish the top and bottom of the hula hoop by the absolute value therefrom. Therefore, it is possible to accurately distinguish the spinning direction of the hula hoop even when the hula hoop is overturned at the time of use.

When the user does not exercise for a certain time (e.g., for 50 to 70 seconds, preferably for 55 to 65 seconds) or overturns the hula hoop while exercising, the gyro sensor, the acceleration sensor, and the gravity sensor detect it to record and complete the previous exercise, and detect that new exercise begins.

When the user spins the hula hoop using her/his waist, it may be measured that the spinning speed of the hula hoop is too fast or too slow or the waist circumference of the user is too small or too large, due to the characteristics of the hula hoop. In this case, for example, the spinning speed ranges from 30 to 300 revolutions per minute (rpm), preferably from 60 to 180 rpm, and the waist circumference ranges from 20 to 40 inches, preferably from 25 to 35 inches. When the spinning speed and the waist circumference fall out of the above range, it is considered that the hula hoop is spun by an abnormal method, namely, by a method other than using the user's waist, for example, by a user's finger or a machine, to simply improve exercise information. In this case, this is not reflected in the user's exercise record, and a notification message may be shown to the user through the wireless communication device as occasion demands. This function is to prevent fraud and guide more fair competition when many users use a ranking system or a game (e.g., the matchup of the number of spins, exercise amount, or spinning speed, or the like).

In addition, to prevent unnecessary consumption of the battery or power, if the spin of the hula hoop is not detected for a certain time, for example, for 60 seconds or more, preferably for 60 to 70 seconds, it is determined that the exercise is completed, and exercise information is analyzed based on the data value of the exercise performed until the completion.

Figure 7:
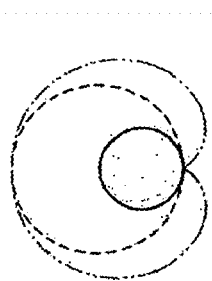
FIG. 7 is a view illustrating a movement path of a hula hoop control unit in relation to the diameter of a hula hoop and the circumference of a user's body part to be exercised.
Figure 7:
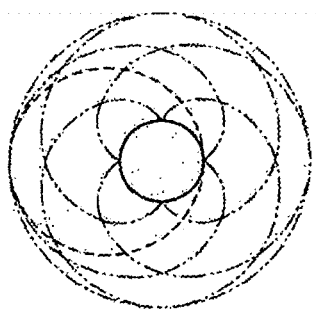
Figure 7:
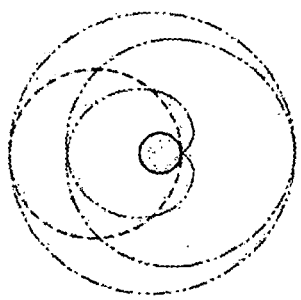
Figure 7:
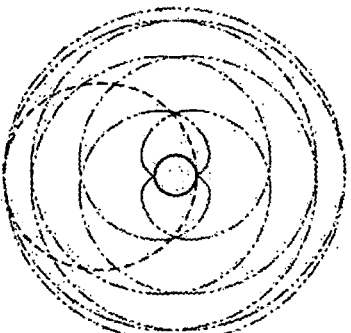

FIG. 7 is a view illustrating a movement path of the hula hoop controller in relation to the diameter of the hula hoop and the circumference of the user's body part to be exercised. As illustrated in FIG. 7, when the user spins the hula hoop, the sensor provided at one side of the hula hoop is repeatedly pressed against and separated from the user' body. Therefore, the yaw value is periodically repeated according to which an angle of rotation is gradually increased or decreased, and the angle of rotation varies depending on the circumference of the user's body part to be exercised (waist or neck circumference) and the diameter of the hula hoop. Preferably, the variation of the angle of rotation is small (smooth) when the circumference of the body part to be exercised (waist or neck circumference) is large, whereas the variation of the angle of rotation is large when the circumference of the body part to be exercised (waist or neck circumference) is small. For example, when the diameter of the hula hoop is 1 m (see FIGS. 7(a) and 7(c)), it can be seen that the movement path of the hula hoop is smooth when the diameter of the waist is 1.25 m (see FIG. 7(a)) compared to when the diameter of the neck is 0.125 m (see FIG. 7(c)). It can be seen that when the body's part to be exercised (waist or neck) has the same diameter (see FIGS. 7(a, b) and 7(c, d)), the movement path of the hula hoop is further increased as the diameter of the hula hoop is increased (1 m in FIG. 7(a, c) and 1.25 m FIG. 7(b, d)). Accordingly, when the user exercises using the hula hoop, data according to the movement path, for example, data related to the movement path of the hula hoop according to the various circumferences of the body part to be exercised (waist or neck), which are 20 to 40 inches, preferably 25 to 35 inches, and/or the various diameters of the hula hoop is input to the MCU, the movement path of the hula hoop is measured using the data value detected by the sensor, and the measured movement path of the hula hoop is compared with the input movement path so that the corresponding circumference of the body part to be exercised (waist or neck) is determined to be a user's waist or neck circumference. Thus, it is possible to guide an exercise method and an exercise time for each user.

The hula hoop of the present invention is suitable for aerobic exercise that burns energy of about 420 calories during exercise for one hour, and simultaneously needs a small space, thereby enabling exercise to be easily performed anywhere. The hula hoop is advantageous in that there is no inconvenience that the user has to directly record exercise information and exercise time whenever exercising since the exercise information (e.g., an exercise time for each left/right direction, the number of spins of the hula hoop, etc.) measured by the sensor is automatically transmitted to and stored in an electronic device through the communication unit and analyzed therein (e.g., calories burned by exercise).

Figure 8:
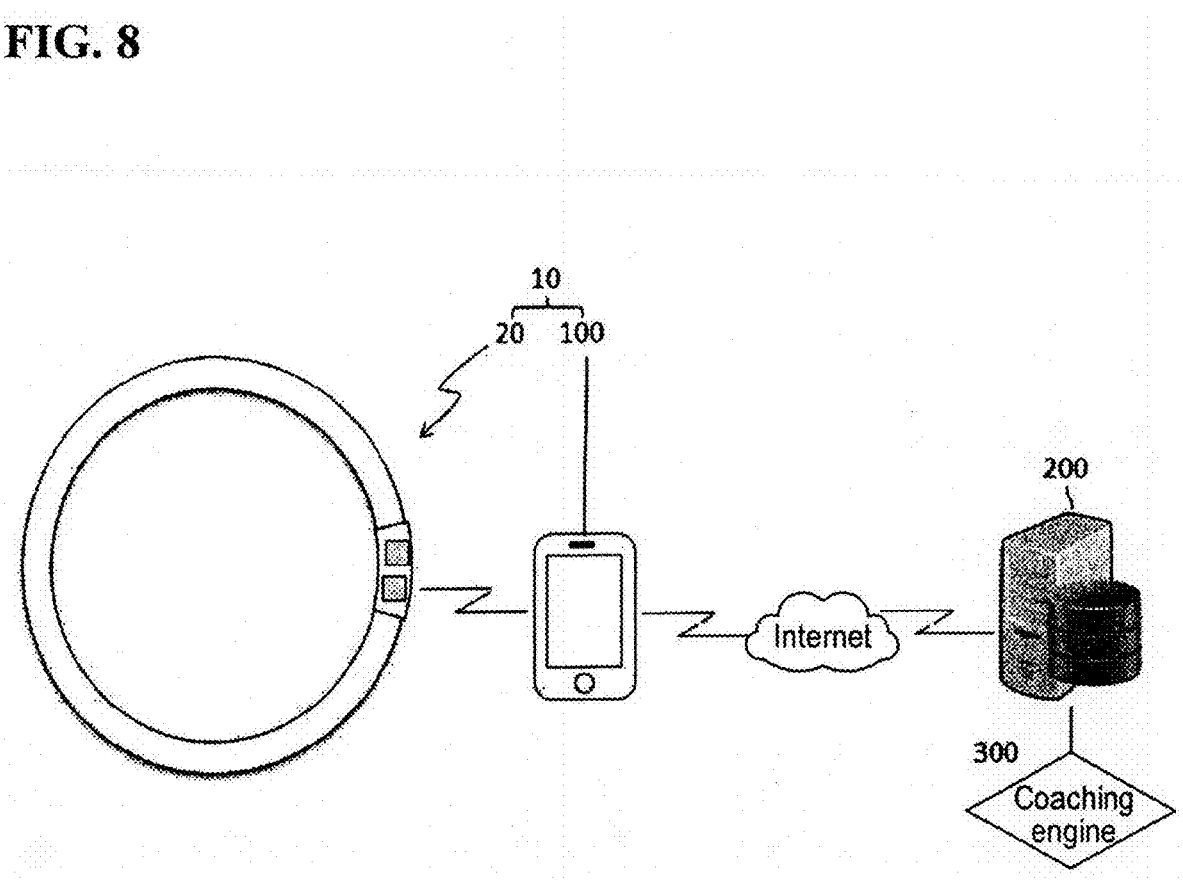
FIG. 8 is a view illustrating an exercise management device according to another embodiment of the present invention.

FIG. 8 is a view illustrating an exercise management device according to another embodiment of the present invention. As illustrated in FIG. 8, the exercise management device according to the present invention may further include an exercise information management server and a coaching engine, which transmit exercise information to and receive it from a dedicated program to propose an effective exercise method to a user and inspire a user's exercise desire based on exercise data by using a type of ranking system for record competition with many users or forming a group with acquaintances. As described above, the user's exercise information is transmitted to a wireless communication device 100 through a control unit of a hula hoop 20, and the user's exercise information, which is transmitted to and obtained in the wireless communication device 100, is transmitted to and collected in an exercise information management server 200 through a dedicated program (application or the like). User's exercise data is analyzed, based on the collected data, in a coaching engine 300 in which exercise information on various waist circumferences is input, and the exercise data, for example the number of spins for each necessary direction, an exercise time, or the like, suitable for the user's waist circumference and weight or the like is transmitted to the exercise information management server 200. The transmitted exercise data is transmitted to the user's wireless communication device 100 so that the user can identify exercise data that she/he currently needs, and thus exercise with effect.

In addition, it is possible to inspire a user's exercise desire by forming an unspecified group using the notice board or the like provided in the dedicated program, or forming a group with acquaintances and indicating an individual exercise amount in the group.

Figure 9:
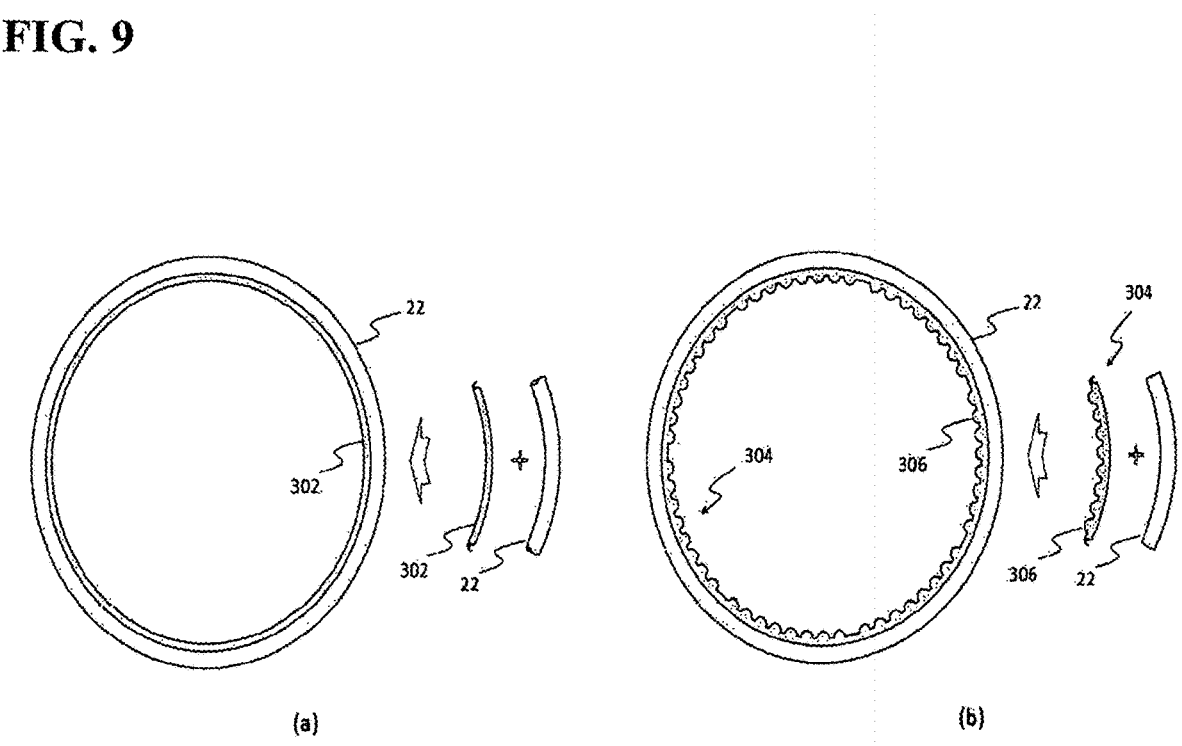
FIG. 9 is a top view illustrating a hula hoop according to another embodiment of the present invention.

FIG. 9 is a top view illustrating a hula hoop according to another embodiment of the present invention. As illustrated in FIG. 9, the hula hoop according to the present invention may further include a general body 302 or a protrusion body 304, which is detachably coupled to the inner peripheral surface of a body 22. The general body 302 has a shape of a typical hula hoop, and the inside thereof is flat (see FIG. 9(a)). The protrusion body 304 has a plurality of protrusions 306 spaced at a certain distance (e.g., at a distance of from 3 to 20 cm, preferably at a distance of from 5 to 15 cm) along the inner peripheral surface thereof (see FIG. 9(b)) in order to provide the waist with strong stimulation to increase an exercise effect.

Although the exercise management device according to the present invention has been described above with reference to the drawings, the present invention is not limited thereto, and various modifications can be made without departing from the spirit or scope of the following claims.

The invention claimed is:

1. An exercise management device using a hula hoop, comprising:
   a hula hoop which comprises:
   an annular body;
   a sensor unit comprising:

(a) a gyro sensor provided at one side of the annular body to measure an angular velocity;
(b) an acceleration sensor for measuring an acceleration; and
(c) a gravity sensor for detecting the direction of gravity;

a control unit comprising:
(1) a micro controller unit for receiving and analyzing a data value detected by the sensor unit and calculating a spinning speed, a spinning direction, and a number of spins to obtain exercise information or transmit the data value;
(2) a communication unit for transmitting the exercise information or the data value to a wireless communication device, wherein the communication unit has a chip communicating via Bluetooth®; and
(3) a power unit for turning on/off the control unit by supplying or blocking power; and the wireless communication device having a dedicated program installed therein for receiving the exercise information or the data value transmitted from the communication unit to display the exercise information or display exercise information obtained by analyzing the data value and calculating the spinning speed, the spinning direction, and the number of spins.

2. The exercise management device according to claim 1, wherein the dedicated program allows a user to perform balanced exercise in both directions by comparing and displaying times or amounts the user exercised in left and right directions.

3. The exercise management device according to claim 1, wherein the dedicated program uses an average gradient of the hula hoop for an exercise time to evaluate an exercise grade, the exercise grade being evaluated as "good" when the average gradient with respect to the horizontal spin of the hula hoop is from zero (0) to 20 degrees, as "fair" when it is from more than 20 degrees to 40 degrees, and as "poor" when it exceeds 40 degrees.

4. The exercise management device according to claim 1, wherein the dedicated program displays calories burned by a user as numbers and a food shape, the food shape gradually disappearing or appearing as the burned calories increase, and the food shape disappearing or appearing when the calories of the corresponding food are equal to burned calories.

5. The exercise management device according to claim 1, wherein the dedicated program calculates a waist circumference based on the exercise information, determines that exercise is abnormal when the spinning speed of the hula hoop falls out of the range of 30 to 300 rpm or the calculated waist circumference falls out of the range of 20 to 40 inches, and does not reflect an exercise record.

6. The exercise management device according to claim 1, wherein the micro controller unit and/or the dedicated program compare(s) a movement path of the hula hoop according to a waist circumference, which is input thereto, with a movement path of the hula hoop detected by the sensor unit for an exercise time, to determine that the corresponding waist circumference is a user's waist circumference.

* * * * *